Oct. 17, 1939. C. C. WASHER 2,176,411
ASSEMBLED LOCK WASHER AND BOLT, SCREW, OR THE LIKE
Filed Sept. 15, 1938
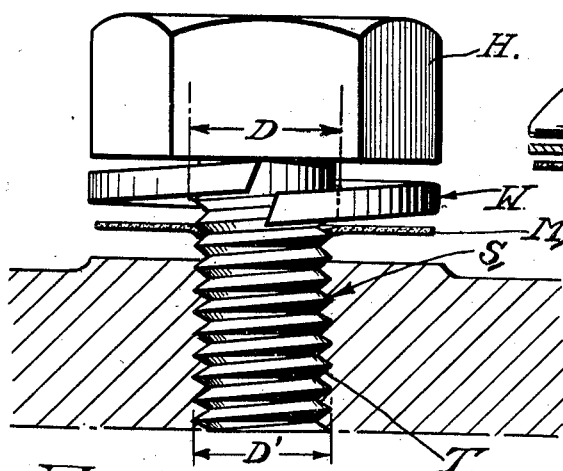
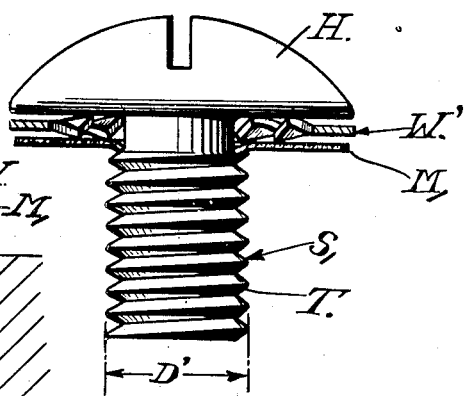
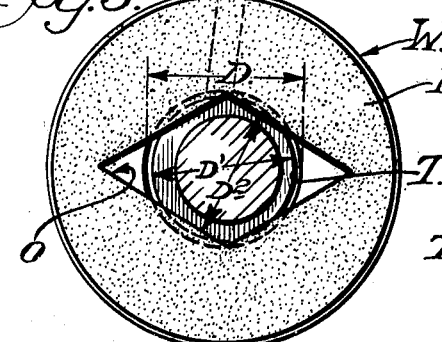
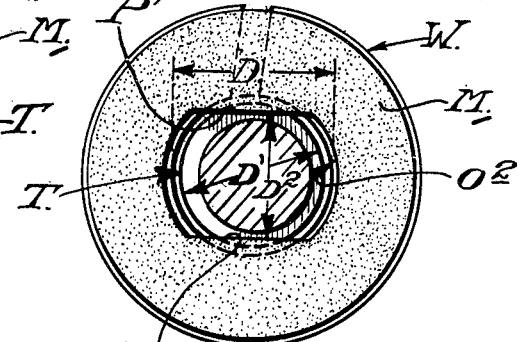
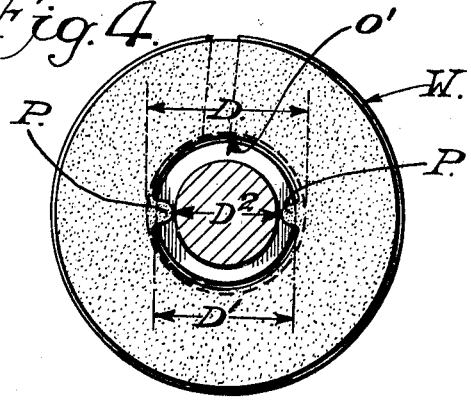
Inventor:—
Chandler C. Washer
by his Attorneys
Howson & Howson Patented Oct. 17, 2,176,411

UNITED STATES PATENT OFFICE 2,176,411

ASSEMBLED LOCK WASHER AND BOLT, SCREW, OR THE LIKE

Chandler C. Washer, Maplewood, N. J., assignor to Philadelphia Steel and Wire Corporation, Philadelphia, Pa., a corporation of Pennsylvania Application September 15, 1938, Serial No. 230,122

5 Claims. (Cl. 151—32)

This invention relates to an assembly of a lock washer with a bolt, screw or the like, and to a method of assembling the same.

Important objects of the invention are to provide a cheap and readily produceable assembly of these elements, and one which may be readily produced by an assembling machine through ordinary hopper methods.

Another object of the invention is to produce an assembly of this type in which the washer is maintained in position upon the bolt or screw through the medium of a readily destructible element which may be passed over the threads of the screw but which resists its return thereover to an extent such that the lock washer is retained in position against the head of the screw or in a position approximating the same.

These and other objects I attain by the construction shown in the accompanying drawing wherein, for the purpose of illustration, I have shown a preferred embodiment of my invention and wherein:

Fig. 1 is a view partially in section showing a bolt and lock washer assembly in accordance with my invention;

Fig. 2 is a similar view illustrating the use of a modified form of washer; and

Figs. 3, 4 and 5 are views illustrating several forms of retainer constructed in accordance with my invention.

Referring now more particularly to the drawing, the character H represents the head of a screw, bolt or the like, and W a lock washer arranged beneath the head H and surrounding the stem S of the bolt or screw. The washer W may either be the ordinary split type of washer, as indicated in Figures 1 and 3 to 5, or a washer of the so-called "shake-proof" type, as illustrated at W' in Figure 2. In either event, the washer itself should have an internal diameter D greater than the maximum diameter D' of the stem of the bolt which is, of course, represented by the threaded portion T thereof so that it may be readily passed over this threaded portion T for engagement against the under surface of the head H.

In combination with the lock washer W or W' and the bolt, I employ a member M which may be formed of paper or any other thin sheet material having sufficient flexibility, and characterized by the fact that it may be readily torn or otherwise disrupted, this member being in the form of an oval, circular or angular blank having a central opening O the major diameter of which is such that it may be readily passed over the threaded portion T of the bolt, and a minor diameter $D^2$ which is less than the extreme diameter of the threaded portion T of the bolt and, more specifically, less than the mean diameter of the bolt plus the depth of the thread at one side thereof.

As illustrated in Figures 3, 4 and 5, the blank M may assume a number of forms. In these figures I have shown some preferred arrangements, that of Fig. 3 illustrating a diamond formed opening the minimum width $D^2$ of the opening of which is less than the diameter D'. In the form shown in Fig. 4, the opening O' is greater than the diameter D', but the edges of the opening are provided with inwardly projecting tabs P the minimum distance between which is a distance $D^2$ less than the distance D'; correspondingly, in the form shown in Fig. 5, the circular opening $O^2$ having a greater diameter than the diameter D' has flats P' the distance $D^2$ between adjacent faces of which is less than diameter D'.

Obviously, in any of the constructions just noted, the edges upon the diameter $D^2$ will readily yield when the member M is forced upon the bolt and if this member be of pliable material such as light paper, board, or light and readily disruptable shim material, the member M will engage in the threads of the bolt and prevent the washer W or W' from escaping therefrom. On the other hand, when the bolt, screw or the like is engaged with the work through the washer W or W' the member M will be destroyed, permitting the washer to have its normal engagement with the working surface. While in Figures 3, 4 and 5 the washer shown is of the "split" type, it will, of course, be understood that the illustration resorted to is purely exemplary, and that the washer actually employed might well be that of Fig. 2 or of any other suitable construction.

As the constructions provided are merely illustrative, I do not wish to be understood as limiting my invention thereto except as hereinafter claimed.

I claim:

1. In combination, a bolt or the like including a head and a threaded shank, a washer upon the shank adjacent the head, and a member, readily destroyed by abrasive action between said washer and the work with which the bolt coacts, engaged with the threads of the shank below the washer, said member having an opening for the passage of the shank defined at least in part by flexible portions spaced apart a distance less than the extreme and greater than the mean diameter of the bolt shank.

2. In combination with a bolt or the like including a head and a threaded shank, a washer upon the shank adjacent the head and a paper disc upon the shank below the washer and engaged with the threads of the shank, said disc having a central opening for the passage of the bolt shank defined at least in part by flexible portions spaced apart a distance less than the extreme and greater than the mean diameter of the bolt shank.

3. In combination, a bolt or the like including a head and a threaded shank, a washer upon the bolt adjacent the head and a member of very thin flexible material and having a major width greater than the internal diameter of the washer, said member being engaged with the threads of the shank below the washer and having an opening for the passage of the shank defined at least in part by flexible portions spaced apart a distance less than the extreme and greater than the mean diameter of the bolt shank.

4. A combination as claimed in claim 3 wherein the member is formed of shim material.

5. A device as claimed in claim 3 wherein the member is formed of paper.

CHANDLER C. WASHER.